United States Patent [19]

Lock

[11] Patent Number: 4,510,664

[45] Date of Patent: Apr. 16, 1985

[54] METHOD OF PRODUCING A PACKING RING

[75] Inventor: Pieter J. Lock, Koelweg, Netherlands

[73] Assignee: Rubber-en Kunststoffabriek ENBI B.V., Nuth, Netherlands

[21] Appl. No.: 467,928

[22] Filed: Feb. 18, 1983

[30] Foreign Application Priority Data

Feb. 25, 1982 [DE] Fed. Rep. of Germany ....... 3206677

[51] Int. Cl.³ .............................................. B23P 11/02
[52] U.S. Cl. ..................................... 29/450; 29/469.5; 29/DIG. 34; 156/218; 156/303.1; 156/304.2; 228/173.4; 277/166
[58] Field of Search .............. 29/DIG. 34, 469.5, 417, 29/450; 277/235 R, 219, 220, 164, 166, 207 A, 228, 227, 152, 153; 228/173 E; 156/218, 303.1, 304.2

[56] References Cited

U.S. PATENT DOCUMENTS

| | | | |
|---|---|---|---|
| 834,611 | 10/1906 | Garlock | 277/227 X |
| 1,179,562 | 4/1916 | Reich | 227/164 |
| 1,721,155 | 7/1929 | Johnson | 277/228 X |
| 2,148,038 | 2/1939 | Raybould | 227/228 X |
| 3,162,456 | 12/1964 | Williams | 277/164 X |
| 3,591,190 | 7/1971 | Winay | 277/164 X |
| 3,660,192 | 5/1972 | Smith et al. | 277/228 X |
| 3,723,216 | 3/1973 | Kirkwood | 277/164 X |
| 4,368,894 | 1/1983 | Parmann | 277/207 A X |

FOREIGN PATENT DOCUMENTS

| | | | |
|---|---|---|---|
| 767275 | 5/1934 | France | 277/227 |
| 1138633 | 1/1957 | France | 277/164 |
| 1567199 | 5/1980 | United Kingdom | 227/228 |

*Primary Examiner*—Charlie T. Moon
*Attorney, Agent, or Firm*—Arthur B. Colvin

[57] ABSTRACT

In order to produce a packing ring having a stiffening ring by a method which dispenses with the use of a complicated and expensive mold, an extrusion having the desired cross-section of the packing ring and having a cavity, extending in the extrusion direction, for the reception of the stiffening ring is firstly produced. The extruded material cut to length in accordance with the desired circumference of the packing ring is slipped onto a wire which is similarly cut to length and bent into a circle. The ends of the extruded material are pushed back while the ends of the wire are welded together, so that a closed stiffening ring is produced. Then the material ends are joined together and are bonded or vulcanized to one another.

3 Claims, 3 Drawing Figures

METHOD OF PRODUCING A PACKING RING

This invention relates to a method of producing a packing ring from elastomeric material comprising a stiffening ring.

A method of producing a packing ring is known, for example, from Netherlands Offenlegungsschrift No. 77 04 936. In this specification the stiffening ring is arranged inside a mould which is then filled with elastomeric material. This method is particularly suitable for mass production of relatively small packing rings. In the production of large packing rings, for example those having a diameter of more than 1 meter, or when a small number of specialized packing rings have to be produced, the cost of manufacturing a mold influences the production costs so much that the preparation of a mold is economically unprofitable.

Production of packing rings having large diameters, or in small numbers, is effected so that the two ends of a specific length of an extrusion of elastomeric material are connected together. One such method is known from Netherlands Offenlegungsschrift No. 72 07 960, in which the use of a stiffening ring is dispensed with. However, the reinforcement of a packing ring with a stiffening ring has the advantage that the packing ring, when forced into a pipe socket, does not assume an unpredictable shape when the end of another pipe that is to be connected thereto is pushed into said socket, as may be the case with a packing ring which is not reinforced. In the later case, after the introduction of the pipe end into the socket, there is no certainty that the packing ring has assumed the intended sealing position inside the annular gap between the socket and the inserted pipe end.

An object of the invention is therefore to provide a method of producing a packing ring without using expensive or complicated molds or dies and in which a sealing ring reinforced with a stiffening ring is provided.

With this object in view, the present invention provides a method of producing a packing ring, including a stiffening ring, characterized in that:

(a). elastomeric material is extruded so as to have a cross-section which corresponds to the desired cross-section of the packing ring that is to be produced, and through which a cavity extends in the extrusion direction;

(b). a portion of the extruded material, the length of which corresponds substantially to the circumference of the packing ring that is to be produced, is detached from the extruded material, (or a desired length of material is formed);

(c). an appropriate length of wire (corresponding to the circumference or peripheral extent of the packing ring or other configuration that is to be produced) and having a cross-section substantially the same size as that of the cavity in the extruded material is bent so as to form a bent circle (or other desired shape);

(d). the portion detached from the extruded material is pushed onto the circular wire;

(e). the free ends of the wire are welded together; and (f). the free ends of the extruded material which has been pushed onto the wire are connected together.

In contrast to known rolling-ring versions, the method in accordance with the invention makes it possible to choose precisely the cross-section of a packing ring so that a reliable seal is ensured, and so that upon introduction of a pipe end into a socket with the packing ring therebetween, the packing ring is not dragged into the annular space in an unpredictable manner i.e. is not distorted. In the case of a packing ring which is produced in accordance with the method of the invention, the stiffening ring is encased completely in the elastomeric material and is therefore sealed off from the surroundings, so that, even upon use of a potentially corrosible material as stiffening ring, it is not exposed to the corroding influences of the surroundings.

Preferably the material used to form the stiffening ring is galvanized steel although other metals or a comparatively stiff plastic material may be suitable. Moreover, the material used for the stiffening ring may conveniently have a rectangular or square cross-section.

Prior to the welding-together of the ends of the circular wire, the ends of the previously slipped-on extruded material are forced back to such an extent that the ends of the wire are freely accessible for the welding operation, so that the welding can be effected without the risk of combustion, oxidation or melting of the elastomeric extruded material. After the welding operation and the cooling-down of the welded joint, the ends of the extrusion are released and connected together by adhesion or vulcanizing.

Preferably the packing ring is provided with a flange, which in use butts against the outwardly facing surface at the mouth of the socket. The flange also advantageously encloses the cavity for reception of the stiffening ring. As a result of this arrangement dragging or distortion of the packing ring when a pipe end is inserted into the socket is prevented.

The packing ring produced in accordance with the method of the invention can be used to connect pipes made of concrete, earthenware, stoneware, asbestos cement and so forth, and having a diameter of 1 to 2 meters or more. Packing rings in accordance with the present invention can also be used in conjunction with plastic pipes of smaller diameters. When only a small number of packing rings are needed they may advantageously be produced in accordance with the method of the invention since the investment required to produce a die is not very large.

The invention will be described further, by way of example, with reference to the accompanying drawings, in which.

Figure 1:
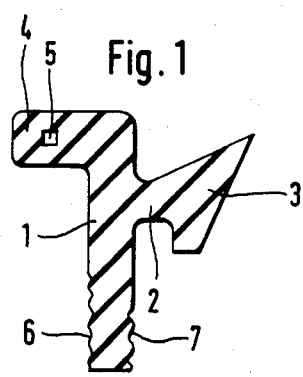
FIG. 1 is a cross-sectional view of the extruded elastomeric material forming part of a preferred embodiment of the packing ring of the invention.
Figure 2:
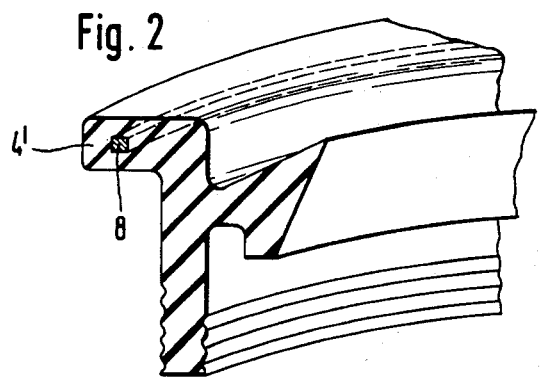
FIG. 2 is a fragmentary perspective view of a portion of the preferred embodiment of the packing ring of the invention.

Referring now to the drawings, an elastomeric material, for example rubber, is extruded so as to have a cross-section which comprises a substantially rectangular part 1 provided on one side with a lip 2, having hammer-headshaped end 3 and on the opposite side with a flange or collar 4. Within the flange 4 is a cavity 5 of a preferably square cross-section which extends in the extrusion direction along the whole length of the extruded material. The lower region of the rectangular part 1 is provided, on its outer and inner surfaces with grooves 6 and 7 respectively.

A length which corresponds to the circumference of the packing ring that is to be produced is detached from the extruded material, whilst a similar length of a galvanized steel wire 8 having a cross-section which fits into the cavity 5 of the elastomeric material is also provided. The steel wire 8 is bent into a circle on a roller bank.

The portion detached from the extruded material is pushed on to the circularly-bent wire, and the ends thereof are forced back to such an extent that the ends of the wire 8 protrude and can be safely welded together, whereupon the elastomeric material is released so that the ends thereof touch one another again. These ends are then preferably bonded or vulcanized together.

Optionally, the wire may be inserted into the cavity and the composite may thereafter be bent to the circular (or other) desired conformation of the end product.

Figure 3:
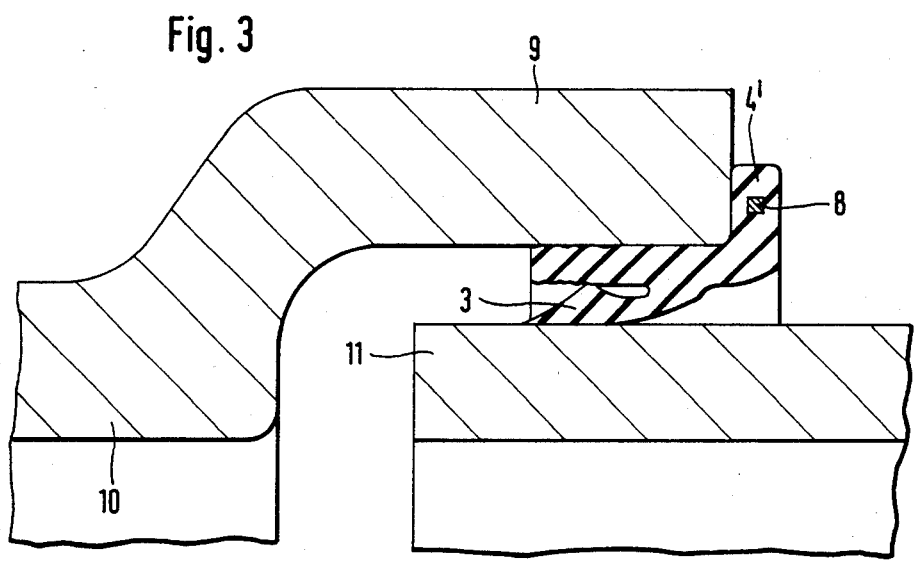
FIG. 3 is a fragmentary cross-section showing the packing ring illustrated in FIG. 2 inserted into the annular gap between a socket and a pipe end.

Since the packing ring is produced in this way, the flange 4 of the initial extrusion forms an outwardly-directed flange 4', which, after the insertion of a pipe end 11 into a socket 9 of a pipe 10, butts against the end face of the socket (as shown in FIG. 3). The stiffening ring 8 inside the flange 4' prevents the packing ring from being dragged along (and consequently distorted) between the pipes 10 and 11 when the pipe is inserted into the socket 9. The lip 2 with the hammerhead-shaped end 3 butts in sealing manner against the outer surface of the pipe 11.

As will be evident to those skilled in the art and familiarized with the instant disclosure, numerous variations in details of construction may be made without departing from the spirit of the invention which is to be broadly construed within the scope of the appended claims.

Having thus described the invention and illustrated its use, what is claimed as new and is desired to be secured by Letters Patents is:

1. The method of producing an annular or other configuration packing ring which comprises the steps of forming a length of elastomeric material having uniform cross-sectional configuration corresponding to the desired cross-section of the packing ring, said length corresponding substantially to the circumferential extent of said ring, said length including a lengthwisely extending cavity, providing a length of wire corresponding generally to the length of the cavity in said length of elastomeric material, said wire being relatively rigid as compared to said elastomeric material and having cross-sectional configuration sized to be intimately received in said cavity, bending said wire to a desired configuration, thereafter introducing said wire into said cavity, to thereby cause said length of elastomeric material to be deformed into said annular or other configuration, causing the free ends of said wire to be mutually interconnected and thereafter causing the free ends of said length of elastomeric material to be juxtaposed in abutting relation.

2. The method in accordance with claim 1 and including the step of retracting the elastomeric material to cause the ends of said wire to be exposed beyond the ends of said length in advance of causing said ends of said wire to be mutually interconnected.

3. The method in accordance with claim 2 and including the step of bonding said juxtaposed ends of said elastomeric material after interconnection of said ends of said wire.

* * * * *